(12) United States Patent
Fabiny

(10) Patent No.: US 7,054,561 B2
(45) Date of Patent: *May 30, 2006

(54) REDUCTION OF POLARIZATION-DEPENDENT LOSS FROM GRATING USED IN DOUBLE-PASS CONFIGURATION

(75) Inventor: Larry Fabiny, Boulder, CO (US)

(73) Assignee: PTS Corporation, San Jose, CA (US)

( * ) Notice: Subject to any disclaimer, the term of this patent is extended or adjusted under 35 U.S.C. 154(b) by 750 days.

This patent is subject to a terminal disclaimer.

(21) Appl. No.: 10/076,182

(22) Filed: Feb. 12, 2002

(65) Prior Publication Data

US 2002/0105697 A1    Aug. 8, 2002

Related U.S. Application Data

(63) Continuation-in-part of application No. 09/706,489, filed on Nov. 3, 2000, now Pat. No. 6,751,415.

(51) Int. Cl.
  *H04J 14/02*    (2006.01)
(52) U.S. Cl. .............................. 398/82; 398/86; 398/87; 398/84
(58) Field of Classification Search ................. 398/45, 398/48, 49, 55–57, 82, 84, 86–88, 96; 385/37
  See application file for complete search history.

(56) References Cited

U.S. PATENT DOCUMENTS

| | | | |
|---|---|---|---|
| 5,414,540 A | 5/1995 | Patel et al. | |
| 5,659,413 A * | 8/1997 | Carlson | 398/122 |
| 5,724,165 A | 3/1998 | Wu | |
| 5,862,287 A | 1/1999 | Stock et al. | |
| 5,912,748 A | 6/1999 | Wu et al. | |
| 5,917,625 A | 6/1999 | Ogusu et al. | |
| 5,960,133 A | 9/1999 | Tomlinson | |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,249,364 B1 | 6/2001 | Martin | |

(Continued)

OTHER PUBLICATIONS

U.S. Appl. No. 09/442,061, filed Nov. 16, 1999, Weverka et al.
6,275,623 B1 8/2001 Brophy et al.

(Continued)

*Primary Examiner*—Leslie Pascal
*Assistant Examiner*—Dalzid Singh
(74) *Attorney, Agent, or Firm*—Townsend and Townsend and Crew LLP

(57) ABSTRACT

A wavelength router receives light having a plurality of spectral bands at an input port. Subsets of these spectral bands are directed to output ports. The wavelength router includes an optical train and a routing mechanism. The optical train is disposed between the input port and output ports. It provides optical paths for routing the spectral bands and includes a wave plate for rotation polarization components and a dispersive element disposed to intercept light traveling from the input port. The optical train is configured so that light encounters the dispersive element and the wave plate twice before reaching any of the output ports. The routing mechanism has at least one dynamically configurable routing element to direct a given spectral band to different output ports depending on its state. For routing elements that use an odd number of reflections, the wave plate is a quarter-wave plate. For routing elements that use an even number reflections, the wave plate is a half-wave plate.

34 Claims, 6 Drawing Sheets

U.S. PATENT DOCUMENTS

| | | | |
|---|---|---|---|
| 6,307,657 B1 | 10/2001 | Ford | |
| 6,362,919 B1 * | 3/2002 | Flanders | 359/497 |
| 6,381,387 B1 | 4/2002 | Wendland, Jr. | |
| 6,396,575 B1 * | 5/2002 | Holland | 356/73.1 |
| 6,529,307 B1 | 3/2003 | Peng et al. | |
| 6,563,977 B1 * | 5/2003 | Chen et al. | 385/24 |
| 6,751,415 B1 * | 6/2004 | Fabiny | 398/50 |

OTHER PUBLICATIONS

Sun, Z.J., et al., "Demultiplexer with 120 Chanels and 0.29-nm Channel Spacing," IEEE Photonics Technology Letters, vol. 10, No. 1, Jan. 1998, pp. 90-92.

Nishi, I., et al., "Broad-Passband-Width Optical Filter for Multi/Demultiplexer Using a Diffraction Grating and a Retroreflector Prism," Electronics Letters, vol. 21, No. 10, May 1985, pp. 423-424.

Phillippe, P., et al., "Wavelength demultiplexer: using echelette gratings on silicon substrate," Applied Optics, vol. 24, No. 7, Apr. 1985, pp. 1006-1011.

Piezo Systems, Inc. Catalog #3, 1998, pp. 1, 30-45.

Ford, Joseph E., et al., "Wavelength Add-Drop Switching Using Tilting Micromirrors," Journal of Lightwave Technology, vol. 17, No. 5, May 1999, pp. 904-911.

Grade, John D. et al., "A Large-Deflection Electrostatic Actuator For Optical Switching Applications," Solid-State Sensor and Actuator Workshop, Hilton Head Island, SC, pp. 97-100, Jun. 4-8, 2000.

Rallison, R. D. et al., "Dense Wavelength Division Multiplexing (DWDM) And The Dickson Grating," White Paper On, 9 pages, Jan. 6, 2001.

* cited by examiner

REDUCTION OF POLARIZATION-DEPENDENT LOSS FROM GRATING USED IN DOUBLE-PASS CONFIGURATION

CROSS-REFERENCES TO RELATED APPLICATIONS

This application is a continuation-in-part application of U.S. patent application Ser. No. 09/706,489, entitled "REDUCTION OF POLARIZATION-DEPENDENT LOSS FROM GRATING USED IN DOUBLE-PASS CONFIGURATION," filed Nov. 3, 2000 now U.S. Pat. No. 6,751,415 by Larry Fabiny, the entire disclosure of which is herein incorporated by reference for all purposes.

BACKGROUND OF THE INVENTION

This application relates generally to optical communications networks, and more specifically to a method and apparatus for reducing the polarization dependent loss from diffraction gratings used in such communications networks.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today, DWDM systems using up to 80 channels are available from multiple manufacturers, with more promised in the future.

Optical wavelength routing functions often use demultiplexing of a light stream into its many individual wavelengths, which are then optically directed along different paths. Subsequently, different wavelength signals may then be multiplexed into a common pathway. Within such routing devices, the optical signals are routed between the common and individual optical pathways by a combination of dispersion and focusing mechanisms. The focusing mechanism forms discrete images of the common pathway in each wavelength of the different optical signals and the dispersion mechanism relatively displaces the images along a focal line by amounts that vary with the signal wavelength.

Both phased arrays and reflection diffraction gratings may be used to perform the dispersing functions. While phased arrays are adequate when the number of channels carrying different wavelength signals is small, reflection diffraction gratings are generally preferable when large numbers of channels are used. However, reflection diffraction gratings tend to exhibit greater polarization sensitivity and since the polarization of optical signals often fluctuates in optical communication systems, this sensitivity may result in large variations in transmission efficiency. Loss of information is possible unless compensating amplification of the signals is used to maintain adequate signal-to-noise ratios. Although polarization sensitivity may generally be mitigated by increasing the grating pitch of the reflection grating, limitations on the desired wavelength dispersion for signals at optical telecommunication wavelengths preclude an increase in grating pitch sufficient to achieve high diffraction efficiency in all polarization directions.

Suggestions to reduce polarization dependent losses in optical switching systems have included complex polarization splitting and recombination techniques, such as described in WO 98/35251, published Aug. 13, 1998. In the method described therein, an optical beam is separated into distinct subbeams for different polarization states and optically constrained to follow different paths, which ultimately converge so that the subbeams may be recombined. Creating and maintaining separate optical paths requires additional components and increases both the cost and complexity of the devices that use the method. Furthermore, the recombination of the subbeams requires very precise alignment of the optical components to prevent the introduction of spurious distortion resulting from imperfect recombination.

It is thus desirable to provide a method and apparatus that reduces or eliminates polarization dependent loss from diffraction gratings used in optical telecommunications systems without requiring beams with different polarization states to follow different optical paths.

BRIEF SUMMARY OF THE INVENTION

Embodiments of the invention thus exploit a discovery of the inventor relating to polarization rotation of light beams in certain optical configurations. A wavelength router made in accordance with embodiments of the invention receives light having a plurality of spectral bands at an input port. Subsets of these spectral bands are directed to respective ones of a plurality of output ports. The wavelength router includes an optical train and a routing mechanism. The optical train is disposed between the input port and output ports. It provides optical paths for routing the spectral bands and includes a wave plate for rotating polarization components and a dispersive element disposed to intercept light traveling from the input port. In one embodiment, the optical train is configured so that light encounters the dispersive element and the wave plate twice before reaching any of the output ports. The routing mechanism has at least one dynamically configurable routing element to direct a given spectral band to different output ports depending on its state.

The inventor has discovered that certain properties of the wave plate may be chosen to reduce or eliminate polarization dependent loss depending on the number of reflections used by the dynamically configurable routing element to effect its routing. If the number of reflections is odd, polarization dependent loss may be eliminated with a quarter-wave plate having a fast axis oriented substantially at an odd multiple of 45° with respect to a polarization axis of the spectral bands. In a specific such embodiment, the number of reflections used by the dynamically configurable routing element is three. If the number of reflections is instead even, polarization dependent loss may be eliminated with a half-wave plate having a fast axis oriented substantially at an odd multiple of 22.5° with respect to a polarization axis of the spectral bands.

Just as the routing mechanism may be configured in a variety of ways to effect different numbers of reflections of the spectral bands, so too can the optical train be configured in a variety of ways to effect the desired routing. In one embodiment, the dispersive element comprises a reflection grating and the optical train further includes a lens. Light coming from the input port is collimated by the lens and dispersed by the reflection grating as a plurality of angularly separated beams corresponding to the spectral bands. The angularly separated beams are focused by the lens on respective dynamically configurable routing elements. The wave plate is disposed between the reflection grating and the routing mechanism; in some embodiments, it is between the lens and the reflection grating, while in other embodiments, it is between the lens and the routing mechanism.

In another embodiment, the dispersive element comprises a transmissive grating and the optical train further includes first and second lenses. Light coming from the input port is collimated by the first lens and dispersed by the transmissive grating as a plurality of angularly separated beams corresponding to the spectral bands. The angularly separated beams are focused by the second lens on respective dynamically configurable routing elements comprised by the routing mechanism. The wave plate is disposed between the transmissive grating and the routing mechanism; in some embodiments, it is between the transmissive grating and the second lens, while in other embodiments, it is between the second lens and the routing mechanism.

In a further embodiment, the dispersive element comprises a reflection grating and the optical train further includes a curved reflector. The curved reflector is disposed to intercept light from the input port, to collimate the intercepted light, and direct the collimated light toward the reflection grating. The curved reflector then intercepts light reflected from the reflection grating, focuses the light and directs the focused light on respective dynamically configurable routing elements comprised by the routing mechanism.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

The following description sets forth embodiments of a method and apparatus that reduces or eliminates polarization dependent losses from a diffraction grating. Embodiments of the invention may be used generally in optical telecommunications systems or in other applications where reduction of polarization dependent losses is desirable. In particular embodiments, such polarization dependent losses are reduced or eliminated in a wavelength router to achieve the goals of optical networking systems.

The general functionality of some such optical wavelength routers that can be used with embodiments of the invention is described in detail in the copending, commonly assigned U.S. patent application, filed Nov. 16, 1999 and assigned Ser. No. 09/442,061, entitled "Wavelength Router" ("the '061 application"), which is herein incorporated by reference in its entirety, including the Appendix, for all purposes. As described therein, such optical wavelength routers accept light having a plurality of spectral bands at an input port and selectively direct subsets of the spectral bands to desired ones of a plurality of output ports. Light entering such a wavelength router from the input port forms a diverging beam, which includes the different spectral bands. The beam is collimated, such as by a lens or concave mirror, and directed to a diffraction grating that disperses the light so that collimated beams at different wavelengths are directed at different angles. The separated beams are directed to the output ports according to states of dynamically configurable routing elements, which in different embodiments may include different numbers of reflective surfaces.

The reduction in polarization dependent losses achieved by embodiments of the invention translates directly into improved efficiency in operation of the wavelength router. As discussed below, different embodiments are more suitable for optical configurations in which the dynamically configurable routing elements have different numbers of reflective surfaces disposed to be encountered by light beams.

2. Diffraction of Optical Signals

Figure 1:
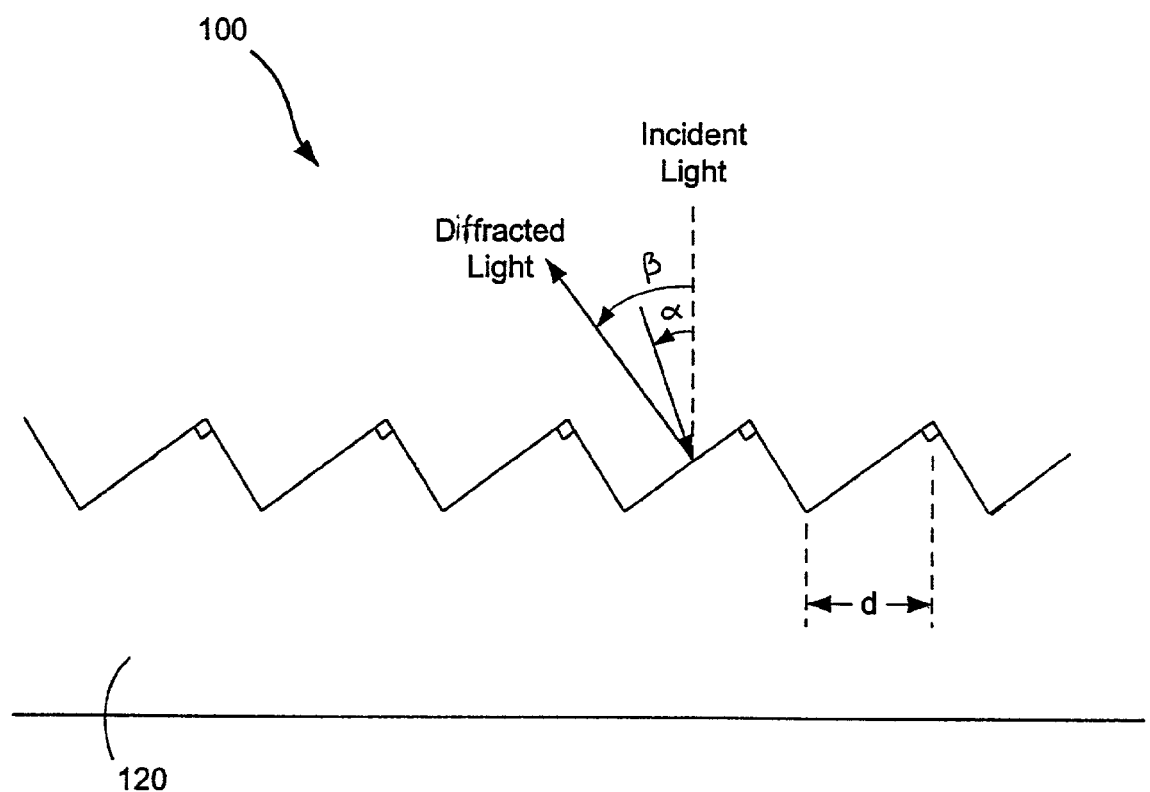
FIG. 1 is a schematic diagram illustrating a reflection diffraction grating.

Demultiplexing of an optical signal that contains a plurality of signals at different wavelengths may be accomplished with a diffraction grating with appropriately sized and shaped diffraction grooves. An example of such a demultiplexing diffraction grating is illustrated in FIG. 1. When illuminated at an angle α from the normal, the grating 100 directs light with wavelength λ toward angle β in accordance with the formula $$m\lambda = d(\sin \alpha \pm \sin \beta),$$

where m is an integral order of interference and d is the grating period. The manner in which incident light will be distributed among the various orders of interference depends on the shape and orientation of the groove sides and on the relation of wavelength to groove separation. When $d \leq \lambda$, diffraction effects predominate in controlling the intensity distribution among orders, but when $d > \lambda$, optical reflection from the sides of the grooves is more strongly involved. Diffraction gratings 100 are manufactured classically with the use of a ruling engine by burnishing grooves with a diamond stylus in a substrate 120 or holographically with the use of interference fringes generated at the intersection of two laser beams.

The efficiency of the diffraction grating depends on the polarization state of the incident light. The electric field E of an arbitrarily polarized incident optical signal may be written as a superposition of two electric fields linearly polarized along two orthogonal axes $\hat{x}$ and $\hat{y}$:

$$E = E_x \hat{x} + E_y \hat{y}.$$

The intensity $I_0$ of the incident signal is defined by the strength of the electric field along the orthogonal directions:

$$I_0 = |E_x|^2 + |E_y|^2,$$

where units have been chosen in which the permittivity of the medium is equal to four times the permeability of the medium to make the remaining derivation more transparent. The efficiency is governed by independent efficiency coefficients $\epsilon$ in the orthogonal polarization directions such that the electric field E' of the signal reflected by the grating is $$E' = -\sqrt{\epsilon_x} E_x \hat{x} - \sqrt{\epsilon_y} E_y \hat{y},$$

with total intensity $$I' = \epsilon_x |E_x|^2 + \epsilon_y |E_y|^2.$$

It is thus evident that the intensity of a signal linearly polarized along one of the two orthogonal axes is reflected by the diffraction grating with an intensity dependent only on the efficiency coefficient for that direction:

$$I'^x = \epsilon_x |E_x|^2$$

$$I'^y = \epsilon_y |E_y|^2.$$

For most diffraction gratings, $\epsilon_x \ne \epsilon_y$, so there may be large variability in the overall efficiency and resulting polarization-dependent loss as a function of the polarization state of the incident signal.

3. Polarization Rotation

In embodiments of the invention, this variability is reduced or eliminated by imposing a polarization rotation. Such a polarization rotation may be achieved by introducing a wave delay along one polarization component of the electric field. In one embodiment, this may be achieved by using a wave plate, which is constructed asymmetrically so that different indices of refraction are achieved in two orthogonal directions. Thus, when the incident optical signal passes through the wave plate, one component of the electric field is delayed relative to the other. Typically, wave plates are constructed to impose phase differences of $\pi$ ("half-wave plate") or $\pi/2$ ("quarter-wave plate"). As explained below, the choice and orientation of a suitable wave plate may depend on certain optical characteristics of a particular arrangement. For example, for the wavelength router assemblies, the polarization-dependent loss may be minimized by using a quarter-wave plate or half-wave plate depending on the number of reflective surfaces comprised by the dynamically configurable routing elements.

Figure 2A:
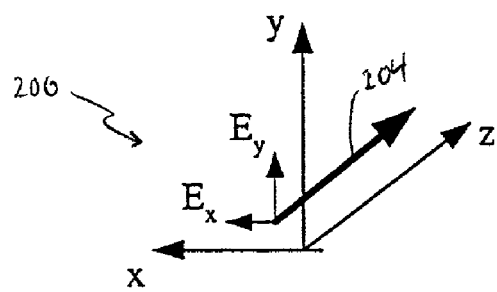
FIG. 2A is a schematic diagram defining a coordinate system used in describing embodiments of the invention.

FIG. 2A illustrates a right-handed (x, y, z) coordinate convention 200 used for illustration of embodiments of the invention in which light propagates along the +z axis. Electric-field components $E_x$ and $E_y$ are orthogonal to each other and to the propagation vector 204, shown in bold. Whenever the propagation vector is altered, such as by reflection from a reflective surface, a new coordinate system (x', y', z') is defined with light propagating along the +z' axis. While new x' and y' axes may be chosen arbitrarily within the constraints of a right-handed coordinate system, the following discussion conventionally defines y' as the reflected image of y, with x' being defined by maintaining a right-handed coordinate system.

Figure 2B:
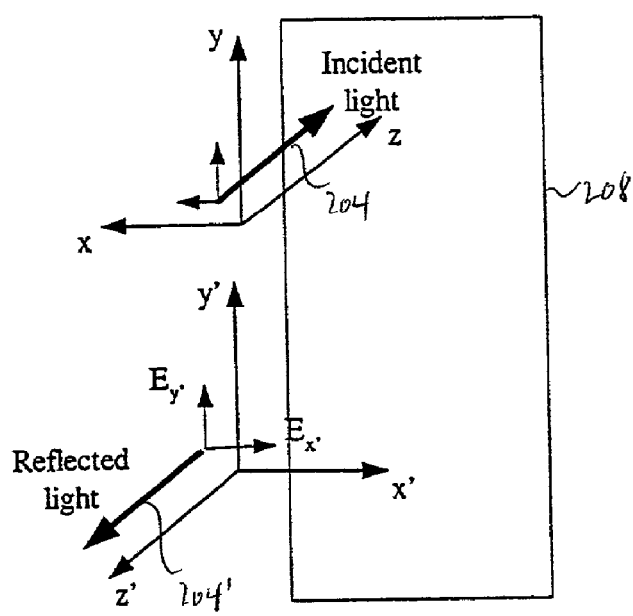
FIG. 2B is a schematic diagram illustrating the effect on the coordinate system of a retroreflection using an odd number of reflections.
Figure 2C:
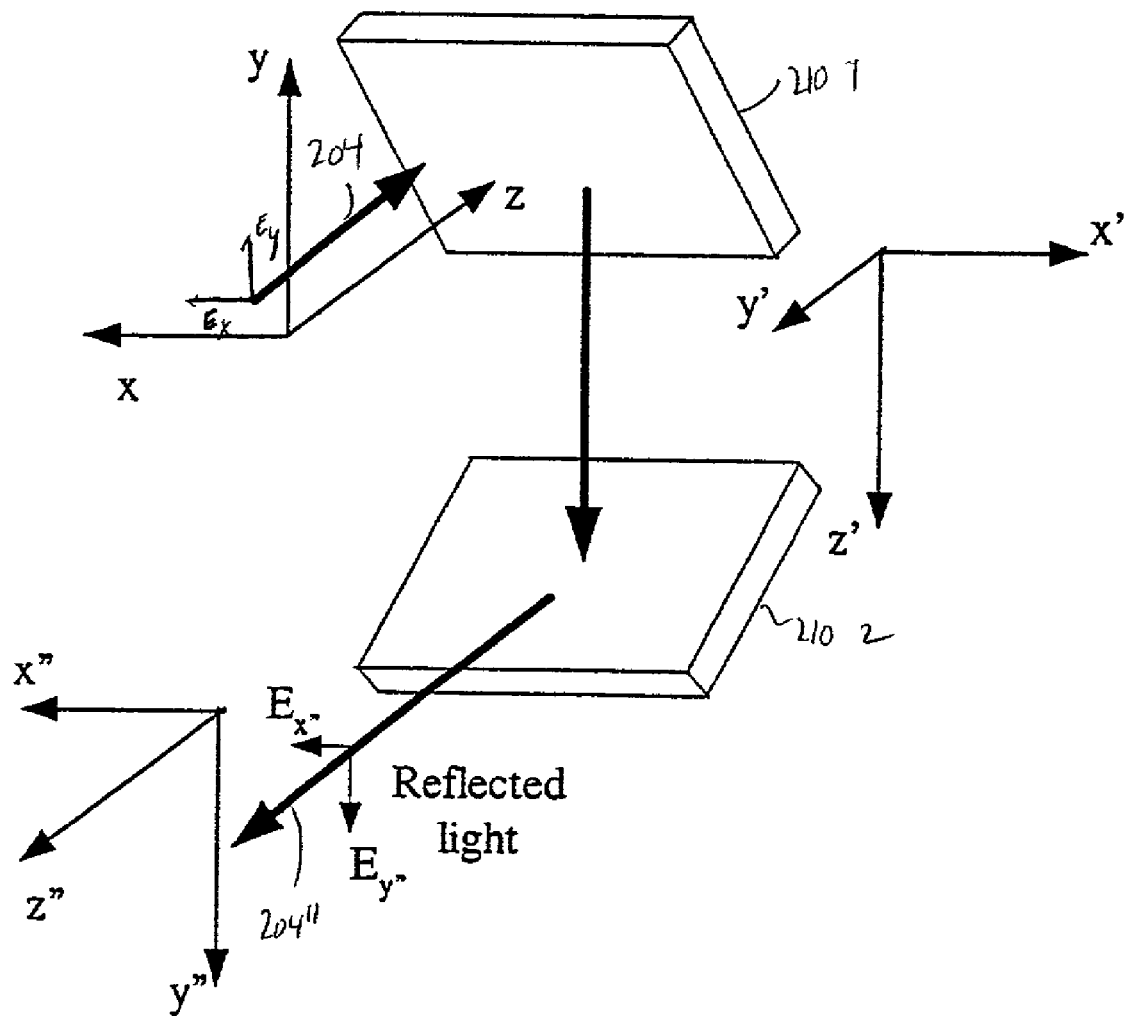
FIG. 2C is a schematic diagram illustrating the effect on the coordinate system of a retroreflection using an even number of reflections.

The effects of retroreflection on the coordinate system are shown in FIGS. 2B and 2C for a retroreflector consisting respectively of on odd number (one) and an even number (two) of reflective surfaces. Thus, in FIG. 2B, the retroreflector consists of a single reflective surface 208 in the xy plane, i.e. orthogonal to the propagation vector. The z axis is reflected so that z' is antiparallel to z and they axis is unchanged by the reflective surface. As a result, x' is antiparallel to x. In FIG. 2C, the retroreflector consists of two reflective surfaces 210 each inclined at 45° relative to the propagation vector. Using the convention described above, the coordinate system (x", y", z") resulting from the two reflections has x" parallel to the original x axis, y" antiparallel to the original y axis, and z" antiparallel to the original z axis.

To account for light polarization states during propagation through an optical assembly, the Jones matrix notation is used for the x and y components, writing the electric field vector as a 1×2 matrix element:

$$E = E_x \hat{x} + E_y \hat{y} = \begin{bmatrix} E_x \\ E_y \end{bmatrix}.$$

In this notation, certain specific polarization states are written as follows:

(i) linear horizontal polarization: $E_0^{LH} = E_0 \hat{x} = E_0 \begin{bmatrix} 1 \\ 0 \end{bmatrix}$;

(ii) linear vertical polarization: $E_0^{LV} = E_0 \hat{y} = E_0 \begin{bmatrix} 0 \\ 1 \end{bmatrix}$;

(iii) right-hand circular polarization ("RHP"): $E_0^{RHP} = E_0 \dfrac{\hat{x} + i\hat{y}}{\sqrt{2}} = \dfrac{E_0}{\sqrt{2}} \begin{bmatrix} 1 \\ i \end{bmatrix}$; and (iv) left-hand circular polarization ("LHP"): $E_0^{LHP} = E_0 \dfrac{\hat{x} - i\hat{y}}{\sqrt{2}} = \dfrac{E_0}{\sqrt{2}} \begin{bmatrix} 1 \\ -i \end{bmatrix}$.

The effects of optical elements such as wave plates and reflective surfaces, are represented by 2×2 matrices T that operate on the polarization vector through matrix multiplication. For a given initial state of polarized light $E_0$ represented as a 1×2 matrix and propagating sequentially through a series n of optical elements $T_1, T_2, \ldots, T_n$, the final polarization matrix $E_f$ is given by $$E_f = T_n T_{n-1} \ldots T_2 T_1 E_0,$$

where $T_i$ corresponds to the matrix representation for optical element $T_i$. For example, the axes transformation for a single reflection from a reflective surface is summarized as (x, y)→(−x', y') so that $$T_{RS} = \begin{bmatrix} -1 & 0 \\ 0 & 1 \end{bmatrix}.$$

For applications having multiple reflections, the following property of $T_{RS}$ is noted:

$$T_{RS}^k = \begin{bmatrix} -1 & 0 \\ 0 & 1 \end{bmatrix}^k = \begin{cases} \begin{bmatrix} -1 & 0 \\ 0 & 1 \end{bmatrix} & (k \text{ odd}) \\ \begin{bmatrix} 1 & 0 \\ 0 & 1 \end{bmatrix} & (k \text{ even}) \end{cases} = \begin{cases} T_{RS} & (k \text{ odd}) \\ \mathcal{I} & (k \text{ even}) \end{cases}$$

The optical effect of a wave plate may also be expressed in such a matrix form. Generally, a birefringent wave plate has a polarization-dependent index of refraction. The fast axis and slow axis of the wave plate define the two orthogonal axes of the wave plate with different indices of refraction. Light polarized parallel to the slow axis experiences a phase retardance $\delta$ relative to light polarized parallel to the fast axis. Denoting the orientation of the wave plate by angle $\theta$ of the fast axis with respect to the x axis, the matrix representation for a generic wave plate is given by $$T_{WP}(\theta, \delta) = \begin{bmatrix} e^{i\delta/2}\cos^2\theta + e^{-i\delta/2}\sin^2\theta & 2i\sin\theta\cos\theta\sin\frac{\delta}{2} \\ 2i\sin\theta\cos\theta\sin\frac{\delta}{2} & e^{-i\delta/2}\cos^2\theta + e^{i\delta/2}\sin^2\theta \end{bmatrix}.$$

For a half-wave plate, $\delta=\pi$, and for a quarter-wave plate, $\delta=\pi/2$.

4. Wavelength Routers

Figure 3A:
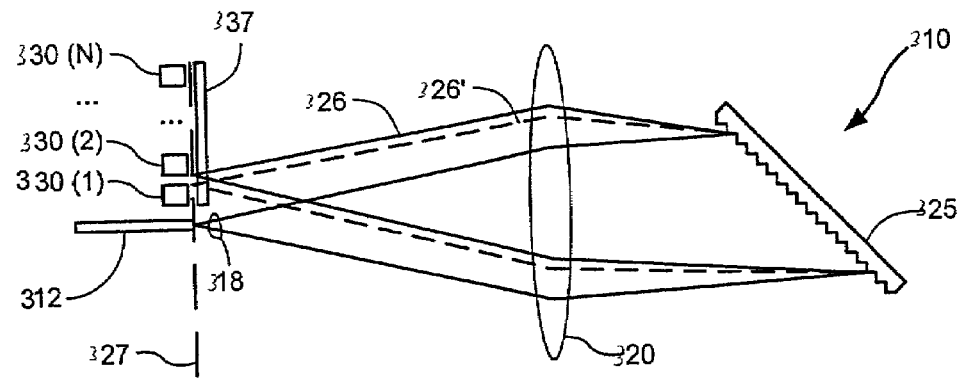
FIGS. 3A–3C are schematic top, side, and end views, respectively, of a wavelength router according to an embodiment of the invention that uses spherical focusing elements with a reflection diffraction grating.
Figure 3B:
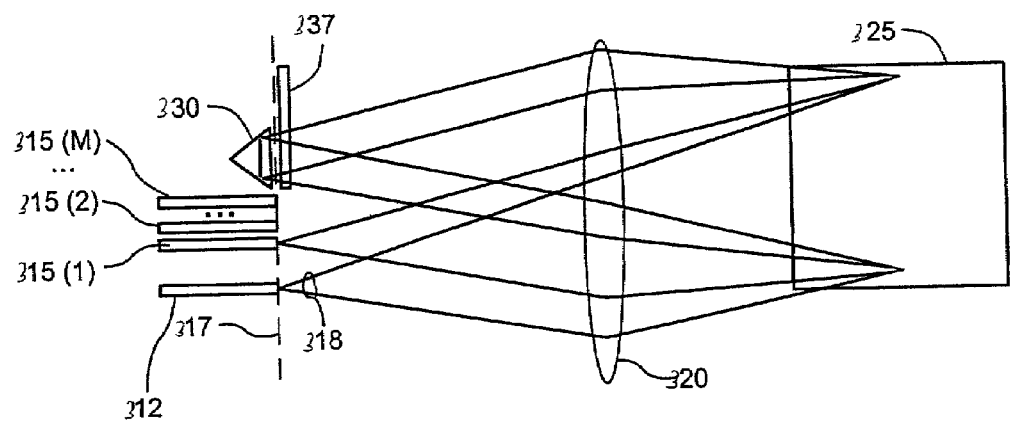
Figure 3C:
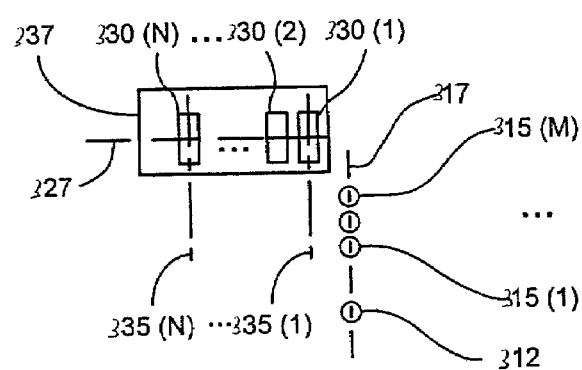

Exemplary embodiments of the invention are provided for wavelength routers, one example of which is illustrated schematically with FIGS. 3A–3C in top, side, and end views, respectively. The general functionality of the wavelength router 310 is to accept light having a plurality of (say N) spectral bands at an input port 312, and selectively direct subsets of the spectral bands to desired ones of a plurality of (say M) output ports, designated 315 (1 . . . M). The output ports are shown in the end view of FIG. 3C as disposed along a line 317 that extends generally perpendicular to the top view of FIG. 3A. The input and output ports are shown as communicating with respective input and output optical fibers, but it should be understood that the input port could also receive light directly from a light source, and the output ports could be coupled directly to optical detectors. The drawing is not to scale.

Light entering the wavelength router 310 from the input port 312 forms a diverging beam 318, which includes the different spectral bands. The beam 318 encounters a lens 320, which collimates the light and directs it to a reflection diffraction grating 325. The grating 325 disperses the light so that collimated beams at different wavelengths are directed at different angles back towards the lens 320. Two such beams are shown explicitly and denoted 326 and 326' (the latter drawn in dashed lines). Since these collimated beams encounter the lens 320 at different angles, they are focused at different points along a line 327 in a transverse focal plane. Line 327 extends in the plane of the top view of FIG. 1A.

The focused beams pass through wave plate 337 and subsequently encounter respective ones of a plurality of retroreflectors, designated 330 (1 . . . N), located near the focal plane. As described below, polarization-dependent loss may be reduced or eliminated with certain configurations of the wave plate 337 depending on the structure of the retroreflectors 330. The beams are directed, as diverging beams, back to the lens 320 after passing again through the wave plate 337. Each retroreflector 330 sends its intercepted beam along a reverse path that may be displaced in a direction perpendicular to line 327. More specifically, the beams are displaced along respective lines 335 (1 . . . N) that extend generally parallel to line 317 in the plane of the side view of FIG. 3B and the end view of FIG. 3C.

In the particular embodiment shown, the displacement of each beam is effected by moving the position of the retroreflector along its respective line 335(i). In other embodiments, the beam displacement is effected by a reconfiguration of the retroreflector. It is noted that the retroreflectors are shown above the output ports in the plane of FIG. 3C, but this is not necessary; other relative positions may occur for different orientations of the grating or other elements.

The beams returning from the retroreflectors are collimated by the lens 320 and directed once more to the grating 325. The grating 325, on the second encounter, removes the angular separation between the different beams, and directs the collimated beams back to the lens 320, which focuses the beams. However, due to the possible displacement of each beam by its respective retroreflector, the beams will be focused at possibly different points along line 317. Thus, depending on the positions of the retroreflectors, each beam is directed to one or another of output ports 315 (1 . . . M).

This embodiment is an airspace implementation of a more generic class of what are referred to as free-space embodiments. In some of the other free-space embodiments, to be described below, the various beams are all within a body of glass. The term "free-space" refers to the fact that the light within the body is not confined in the dimensions transverse to propagation, but rather can be regarded as diffracting in these transverse dimensions. Since the second encounter with the dispersive element effectively undoes the dispersion induced by the first encounter, each spectral band exits the router with substantially no dispersion.

In the embodiment illustrated with FIGS. 3A, 3B, and 3C, the effect of certain configurations of the wave plate 337 is to reduce or eliminate polarization-dependent loss in the wavelength router 310. The specific effect of the wave plate may be understood by comparing the electric field that results without it (as in FIGS. 1A, 1B, and 1C of the '061 application) and with it (as in the current FIGS. 3A, 3B, and 3C). The effect of the wave plate 337 may be understood by examining the polarization state of light immediately before the first diffraction-grating encounter and the polarization state of light immediately after the second diffraction-grating encounter. The diffraction grating 325 may have a polarization-dependent efficiency so that its Jones matrix representation is $$T_g = \begin{bmatrix} \varepsilon_x & 0 \\ 0 & \varepsilon_y \end{bmatrix},$$

where $\varepsilon_x$ and $\varepsilon_y$ are respectively the electric-field efficiencies of horizontally and vertically polarized light. The electric-field vector initially incident on the diffraction grating 325 is written generally as $E_0=\alpha\hat{x}+\beta\hat{y}$, where $\alpha$ and $\beta$ are complex electric-field coefficients. If the retroreflectors 330 have n reflective surfaces, the electric field after sequentially encountering the grating 325 a first time, encountering one of the retroreflectors 330, and encountering the grating 325 a second time, is given by $$\begin{aligned} E_f &= T_g T_{RS}^n T_g E_0 \\ &= \begin{bmatrix} \varepsilon_x & 0 \\ 0 & \varepsilon_y \end{bmatrix} \begin{bmatrix} -1 & 0 \\ 0 & 1 \end{bmatrix}^n \begin{bmatrix} \varepsilon_x & 0 \\ 0 & \varepsilon_y \end{bmatrix} \begin{bmatrix} \alpha \\ \beta \end{bmatrix} \\ &= \begin{bmatrix} \pm\varepsilon_x^2\alpha \\ \varepsilon_y^2\beta \end{bmatrix}, \end{aligned}$$

where the ± corresponds to whether n is even ("+") or odd ("−"). In either case, the efficiency $\epsilon$ is given by $$\varepsilon = \frac{E_f^\dagger \cdot E_f}{E_0^\dagger \cdot E_0} = \frac{\varepsilon_x^4 \alpha^2 + \varepsilon_y^4 \beta^2}{\alpha^2 + \beta^2}.$$

With no wave plate, the efficiency is a strong function of $\alpha$ and $\beta$. Because $\alpha$ and $\beta$ evolve slowly over time, the efficiency $\epsilon$ is time dependent, varying between the extremes of $\epsilon = \epsilon_x^4$ (for horizontal polarization where $\beta = 0$) and $\epsilon = \epsilon_y^4$ (for vertical polarization where $\alpha = 0$). In the absence of the wave plate, the efficiency is independent of the number of reflective surfaces comprised by the retroreflectors 330.

The efficiency for the arrangement including the wave plate 337 positioned as shown in FIGS. 3A–3C can be calculated similarly. While the illustration shows the wave plate 337 at a particular location between the lens 320 and the retroreflectors 337, the resulting efficiency is the same for any position of the wave plate 337 between the grating 325 and the retroreflectors 330. For example, the wave plate 337 could be positioned nearer the lens 320 than is shown or could be positioned between the lens 320 and the grating 325, without affecting the efficiency of the arrangement. The position of the wave plate 337 in different embodiments may account for a desired tradeoff between cost and performance. More uniform performance is generally achieved in collimated space between the lens 320 and grating 325, but reduced cost may be achieved by using a wave plate 337 with a smaller aperture if it is positioned closer to the retroreflectors 330.

If the retroreflectors 330 have n reflective surfaces, the electric field after sequentially encountering the grating 325 a first time, encountering the wave plate 337 a first time, encountering one of the retroreflectors 330, encountering the wave plate a second time, and encountering the grating 325 a second time, is given by $$E_f = T_g T_{WP}(\theta_2, \delta) T_{RS}^n T(\theta_1, \delta) T_g E_0,$$

where $\theta_1$ and $\theta_2$ respectively define the angle of the waveplate fast axis for the first and second encounters. Some specific embodiments are noted.

First, in one embodiment, the number of reflections n provided by the retroreflector 337 is odd. In this embodiment, the wave plate 337 comprises a quarter wave plate oriented with the fast axis at 45° relative to the x axis so that $\delta = \pi/2$ and $\theta_1 = \pi/4$. For the second pass through the wave plate 337, the angle of the fast axis with respect to the new x axis is $\theta_2 = \pi - \pi/4 = 3\pi/4$. Using the fact that for an odd number of reflections, $T_{RS}^n = T_{RS}$, the electric field is given by $$E_f = T_g T_{WP}(3\pi/4, \pi/2) T_{RS} T_{WP}(\pi/4, \pi/2) T_g E_0$$

$$= \begin{bmatrix} \varepsilon_x & 0 \\ 0 & \varepsilon_y \end{bmatrix} \begin{bmatrix} 1/\sqrt{2} & -i/\sqrt{2} \\ -i/\sqrt{2} & 1/\sqrt{2} \end{bmatrix} \begin{bmatrix} -1 & 0 \\ 0 & 1 \end{bmatrix} \begin{bmatrix} 1/\sqrt{2} & i/\sqrt{2} \\ i/\sqrt{2} & 1/\sqrt{2} \end{bmatrix} \begin{bmatrix} \varepsilon_x & 0 \\ 0 & \varepsilon_y \end{bmatrix} E_0$$

$$= i \begin{bmatrix} \varepsilon_x & 0 \\ 0 & \varepsilon_y \end{bmatrix} \begin{bmatrix} 0 & -1 \\ 1 & 0 \end{bmatrix} \begin{bmatrix} \varepsilon_x & 0 \\ 0 & \varepsilon_y \end{bmatrix} E_0$$

$$= i \begin{bmatrix} 0 & -\varepsilon_x \varepsilon_y \\ \varepsilon_x \varepsilon_y & 0 \end{bmatrix} E_0.$$

The resulting efficiency is independent of the incident electric field $E_0$:

$$\varepsilon = \frac{E_f^\dagger \cdot E_f}{E_0^\dagger \cdot E_0} = \frac{-i \begin{bmatrix} 0 & -\varepsilon_x \varepsilon_y \\ \varepsilon_x \varepsilon_y & 0 \end{bmatrix} E_0^\dagger \cdot i \begin{bmatrix} 0 & \varepsilon_x \varepsilon_y \\ -\varepsilon_x \varepsilon_y & 0 \end{bmatrix} E_0}{E_0^\dagger \cdot E_0}$$

$$= \frac{\varepsilon_x^2 \varepsilon_y^2 I E_0^\dagger \cdot E_0}{E_0^\dagger \cdot E_0}$$

$$= \varepsilon_x^2 \varepsilon_y^2.$$

Thus, the presence of a suitably oriented quarter-wave plate for any retroreflector providing an odd number of reflections eliminates polarization-dependent loss. Using the expressions provided above, it is a matter of routine skill to verify that the efficiency $\epsilon = \epsilon_x^2 \epsilon_y^2$ is independent of the initial state of polarization for any angle $\theta_1 = m\pi/4$, where m is an odd integer. Thus, for every such quarter-wave plate configuration where the retroreflectors 330 provide an odd number of reflections, the polarization-dependent loss may be eliminated.

It is noted that where the number of reflections n is even so that $T_{RS}^n = I$, the quarter-wave plate does not eliminate the polarization-dependent loss:

$$E_f = T_g T_{WP}(3\pi/4, \pi/2) I T_{WP}(\pi/4, \pi/2) T_g E_0$$

$$= \begin{bmatrix} \varepsilon_x & 0 \\ 0 & \varepsilon_y \end{bmatrix} \begin{bmatrix} 1/\sqrt{2} & -i/\sqrt{2} \\ -i/\sqrt{2} & 1/\sqrt{2} \end{bmatrix} \begin{bmatrix} 1 & 0 \\ 0 & 1 \end{bmatrix} \begin{bmatrix} 1/\sqrt{2} & i/\sqrt{2} \\ i/\sqrt{2} & 1/\sqrt{2} \end{bmatrix} \begin{bmatrix} \varepsilon_x & 0 \\ 0 & \varepsilon_y \end{bmatrix} E_0$$

$$= \begin{bmatrix} \varepsilon_x & 0 \\ 0 & \varepsilon_y \end{bmatrix} \begin{bmatrix} 1 & 0 \\ 0 & 1 \end{bmatrix} \begin{bmatrix} \varepsilon_x & 0 \\ 0 & \varepsilon_y \end{bmatrix} E_0$$

$$= \begin{bmatrix} \varepsilon_x^2 & 0 \\ 0 & \varepsilon_y^2 \end{bmatrix} E_0.$$

The efficiency $\epsilon$ is the same as without the quarter-wave plate, as shown by calculating the efficiency explicitly for $E_0 = \alpha \hat{x} + \beta \hat{y}$:

$$\varepsilon = \frac{E_f^\dagger \cdot E_f}{E_0^\dagger \cdot E_0} = \frac{\varepsilon_x^4 \alpha^2 + \varepsilon_y^4 \beta^2}{\alpha^2 + \beta^2}.$$

It is instead possible to eliminate the polarization-dependent loss by using a suitably oriented half-wave plate positioned between the grating 325 and the retroreflectors 330, such as in the position shown in FIG. 3A. Such a half-wave plate corresponds to $\delta = \pi$. In one such embodiment, the half wave plate is oriented so that on the first encounter, the fast axis is at 22.5° relative to the x axis so that $\theta_1 = \pi/8$. For the second pass through the wave plate 337, the angle of the fast axis with respect to the new x axis is $\theta_2 = \pi - \pi/8 = 7\pi/8$. Using the fact that for an even number of reflections, $T_{RS}^n = I$, the electric field is given by $$E_f = T_g T_{WP}(7\pi/8, \pi) I T_{WP}(\pi/8, \pi) T_g E_0$$

-continued $$= \begin{bmatrix} \varepsilon_x & 0 \\ 0 & \varepsilon_y \end{bmatrix} \begin{bmatrix} i/\sqrt{2} & -i/\sqrt{2} \\ -i/\sqrt{2} & -i/\sqrt{2} \end{bmatrix} \begin{bmatrix} 1 & 0 \\ 0 & 1 \end{bmatrix} \begin{bmatrix} i/\sqrt{2} & i/\sqrt{2} \\ i/\sqrt{2} & -i/\sqrt{2} \end{bmatrix} \begin{bmatrix} \varepsilon_x & 0 \\ 0 & \varepsilon_y \end{bmatrix} E_0$$

$$= \begin{bmatrix} \varepsilon_x & 0 \\ 0 & \varepsilon_y \end{bmatrix} \begin{bmatrix} 0 & -1 \\ 1 & 0 \end{bmatrix} \begin{bmatrix} \varepsilon_x & 0 \\ 0 & \varepsilon_y \end{bmatrix} E_0$$

$$= \begin{bmatrix} 0 & -\varepsilon_x \varepsilon_y \\ \varepsilon_x \varepsilon_y & 0 \end{bmatrix} E_0.$$

The resulting efficiency is thus independent of the state of polarization of incident electric field $E_0$ and the polarization-dependent loss is eliminated by the two passes through the half-wave plate:

$$\varepsilon = \frac{E_f^\dagger \cdot E_f}{E_0^\dagger \cdot E_0} = \frac{\begin{bmatrix} 0 & -\varepsilon_x \varepsilon_y \\ \varepsilon_x \varepsilon_y & 0 \end{bmatrix} E_0^\dagger \cdot \begin{bmatrix} 0 & \varepsilon_x \varepsilon_y \\ -\varepsilon_x \varepsilon_y & 0 \end{bmatrix} E_0}{E_0^\dagger \cdot E_0}$$

$$= \frac{\varepsilon_x^2 \varepsilon_y^2 I E_0^\dagger \cdot E_0}{E_0^\dagger \cdot E_0}$$

$$= \varepsilon_x^2 \varepsilon_y^2.$$

While the above result has been shown explicitly for a half wave plate oriented so that $\theta_1 = \pi/8$, it is a matter of routine skill to verify that the efficiency $\varepsilon = \varepsilon_x^2 \varepsilon_y^2$ is independent of the initial state of polarization for any angle $\theta_1 = m\pi/8$, where m is an odd integer. Thus, for every such half-wave plate configuration where the retroreflectors 330 provide an even number of reflections, the polarization-dependent loss may be eliminated.

Experimental verifications have confirmed that the number of reflections that take place within the retroreflectors 330 affect whether a quarter-wave plate or half-wave plate are preferred to eliminate the polarization-dependent loss. Examples of retroreflectors 330 that use an odd number of reflections are provided in copending, commonly assigned U.S. patent application Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland ("the '998 application), the entire disclosure of which is herein incorporated by reference for all purposes. Specific examples of retroreflector structures that use three reflections are shown in FIGS. 6A and 6B of the '998 application. In a wavelength router configuration such as shown in FIGS. 3A–3C that uses such a three-reflection retroreflector structure, the wave plate 337 preferably comprises a quarter-wave plate oriented so that its fast axis is at an odd multiple of 45° relative to the x axis. Other retroreflector structures that provide an odd number of reflections will be evident to those of skill in the art.

Figure 4A:
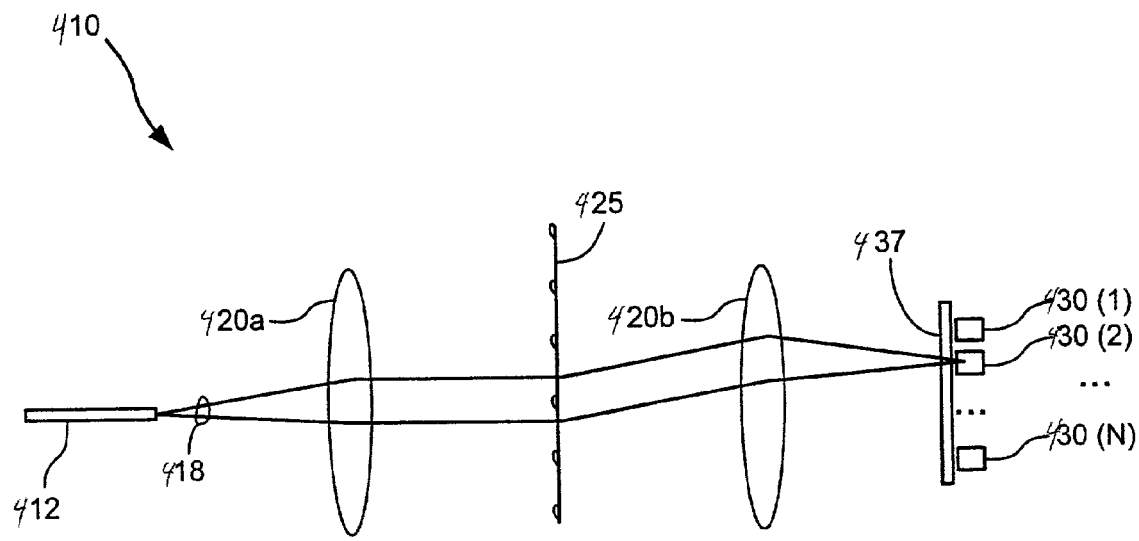
FIGS. 4A and 4B are schematic top and side views, respectively, of a wavelength router according to another embodiment of the invention that uses spherical focusing elements with a transmissive diffraction grating.
Figure 4B:
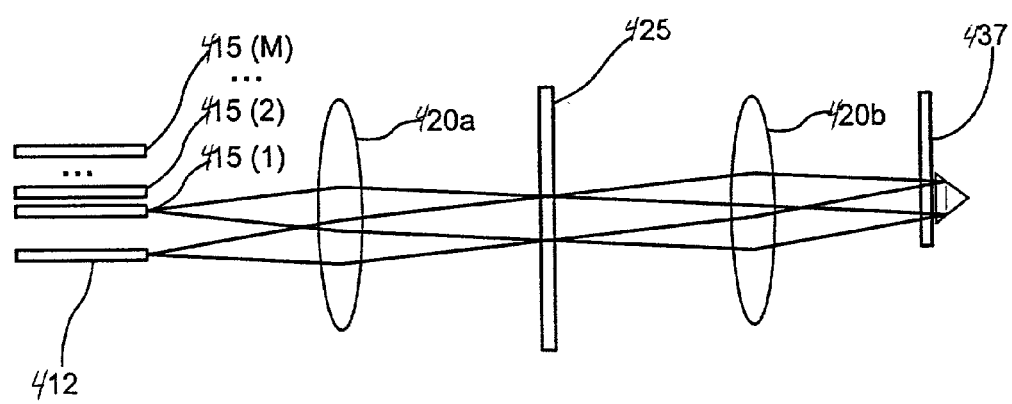
Figure 5:
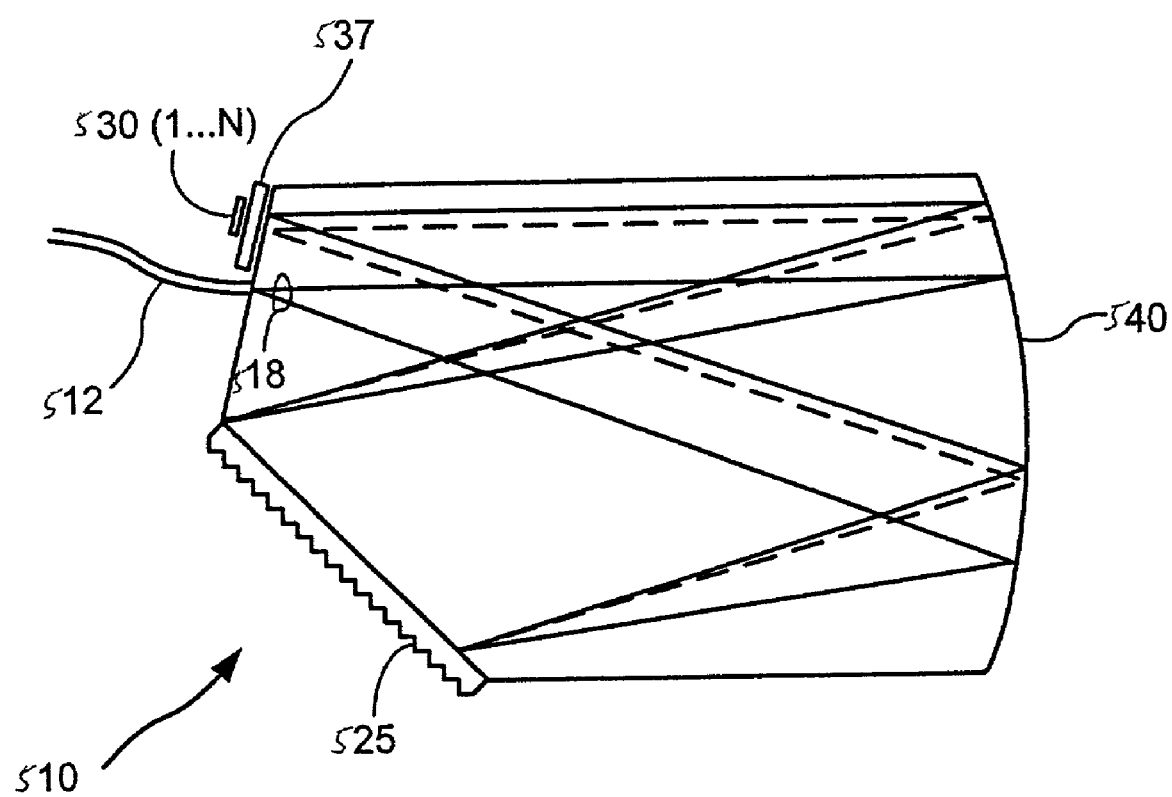
FIG. 5 is a schematic top view of a wavelength router according to a solid-glass embodiment of the invention that uses spherical focusing elements.

Examples of retroreflectors 330 that use an even number of reflections are provided in FIGS. 4A, 4B, and 5 of the '998 application. Such retroreflectors may use MEMS devices such as described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3,2001 by Lilac Muller; and U.S. patent application Ser. No. 09/899,014, entitled "METHODS AND APPARATUS FOR PROVIDING A MULTI-STOP MICROMIRROR," filed Jul. 3, 2001 by David Paul Anderson. FIGS. 4A, 4B, and 5 of the '998 application provide examples of retroreflector structures that provide two reflections. Still other examples of retroreflector structures that provide two reflections are provided in FIGS. 4A, 4B, 5A, 5B, and SD of the '061 application. In a wavelength router configuration such as shown in FIGS. 3A–3C that uses any of such two-reflection retroreflector structures, the wave plate 337 preferably comprises a half-wave plate oriented so that its fast axis is at an odd multiple of 22.5° relative to the x axis. Still other examples of retroreflector structures that provide an even number of reflections will be evident to those of skill in the art.

The principles of the invention may be used in wavelength routers having a variety of alternative configurations. For example, one alternative embodiment for the wavelength router is shown in FIGS. 4A and 4B, and is designated generally 410. FIGS. 4A and 4B are respectively schematic top and side views of the wavelength router 410, which uses a transmissive diffraction grating 425 in place of the reflection diffraction grating 325 used in the embodiment illustrated in FIGS. 3A–3C. In addition, this embodiment differs from the embodiment of FIGS. 3A–3C by using a pair a pair of lenses 420a and 420b. Thus, this embodiment can be considered an unfolded version of the embodiment of FIGS. 3A–3C.

Light entering wavelength router 410 from input port 412 forms a diverging beam 418, which includes the different spectral bands. Beam 418 encounters the first lens 420a, which collimates the light and directs it to the transmissive grating 425. The grating 425 disperses the light so that collimated beams at different wavelengths emerge from the beam and proceed. The collimated beams, one of which is shown, encounter the second lens 420b, which focuses the beams. The focused beams pass through the wave plate 437 and then encounter respective ones of plurality of retroreflectors 430 (1 . . . N), located near the focal plane. Except for the fact that beams are transmitted through the grating 425 rather than reflected, the grating 425 is equivalent to the reflection grating 325 used in the embodiment of FIGS. 3A–3C in that it may have a polarization-dependent efficiency. Accordingly, it has the same general Jones matrix representation as the reflection grating:

$$\mathcal{T}_g = \begin{bmatrix} \varepsilon_x & 0 \\ 0 & \varepsilon_y \end{bmatrix}.$$

The beams are reflected, and emerge as diverging beams that again pass through the wave plate 437, back to the second lens 420b, are collimated, and directed to the grating 425. The grating 425, on the second encounter, removes the angular separation between the different beams, which are then focused in the plane of output ports 415 (1 . . . M). In the specific implementation, the input port 412, the lens 420a, the grating 425, the lens 420b, and the retroreflectors 430 are spaced at approximately equal intervals, with the two lenses having equal focal lengths and the distance between the input port 412 and the retroreflectors 430 being four times (4×) the focal length. Thus the focal lengths and the relative positions define what is referred to as a "4f relay" between the input port 412 and the retroreflectors 430, and also a 4f relay between the retroreflectors 430 and the Output ports 415. This configuration is not necessary, but is preferred. The optical system is preferably telecentric.

Since the matrix representation for the transmissive grating 425 is the same as the matrix representation for the reflection grating considered above, the preferred choice of which type of wave plate 437 to use depends in a similar fashion on whether the retroreflectors 430 are configured to provide an even or odd number of reflections. If configured for an odd number of reflections, the wave plate 437 preferably comprises a quarter-wave plate having a fast axis oriented at an odd multiple of 450 with respect to one of the polarization axes. If configured for an even number of reflections, the wave plate 437 preferably comprises a half-wave plate with a fast axis oriented at an odd multiple of 22.5° with respect to one of the polarization axes. In certain specific embodiments, the retroreflectors 430 are configured as described in the '061 and/or '998 applications to provide two or three reflections, although other numbers of reflections may be provided with different configurations of the retroreflectors 430.

In still another wavelength-router embodiment, illustrated in FIG. 5, a solid glass configuration is used to route optical signals, the wavelength router in this embodiment being denoted 510. This embodiment can be considered to be a further folded version of the embodiment illustrated in FIGS. 3A–3C, using a concave reflector 540 instead of a lens 320 (or instead of lenses 420a and 420b in the embodiment shown in FIGS. 4A–4C) to direct light. As above, light entering the wavelength router 510' from input port 512 forms a diverging beam 518, which includes the different spectral bands. The beam 518 encounters the concave reflector 540, which collimates the light and directs it to a reflection diffraction grating 525. As for the embodiment described with respect to FIGS. 3A–3C, the reflection diffraction grating 525 has a general Jones matrix representation $$T_g = \begin{bmatrix} \varepsilon_x & 0 \\ 0 & \varepsilon_y \end{bmatrix}.$$

The grating 525 disperses the light so that collimated beams at different wavelengths are directed at different angles back toward the reflector 540. Two such beams are shown explicitly, one in solid lines and one in dashed lines. Since these collimated beams encounter the reflector at different angles, they are focused at different points in a transverse focal plane. The focused beams pass through a wave plate 537 and encounter retroreflectors 530 (1 . . . N) located near the focal plane. The operation in the reverse direction is as described in connection with the embodiments above, and the beams follow the reverse path, which is displaced in a direction perpendicular to the plane of FIG. 5. Therefore, the return paths directly underlie the forward paths and are therefore not visible in FIG. 5. On this return path, the beams encounter the concave reflector 540, the reflection grating 525, and the concave reflector 540, the final encounter with which focuses the beams to the desired output ports (not shown in this figure) since they underlie input port 512.

Since the matrix representation for the grating 525 is the same as the matrix representation for the reflection grating considered in connection with FIGS. 3A–3C, the preferred choice of which type of wave plate 537 to use depends in a similar fashion on whether the retroreflectors 530 are configured to provide an even or odd number of reflections. If configured for an odd number of reflections, the wave plate 537 preferably comprises a quarter-wave plate having a fast axis oriented at an odd multiple of 45° with respect to one of the polarization axes. If configured for an even number of reflections, the wave plate 537 preferably comprises a half-wave plate with a fast axis oriented at an odd multiple of 22.5° with respect to one of the polarization axes. In certain specific embodiments, the retroreflectors 530 are configured as described in the '061 and/or '998 applications to provide two or three reflections, although other numbers of reflections may be provided with different configurations of the retroreflectors 530.

Still other wavelength-router embodiments that use the wave plate as described above are within the scope of the invention. For example, while the embodiments illustrated in FIGS. 3A–5 use spherical focusing elements, alternative embodiments use cylindrical focusing elements. In particular, wave plates may be introduced in accordance with the invention into the arrangements shown in FIGS. 6A–9B of the '061 application to reduce or eliminate polarization dependent losses.

Having described several alternative embodiments, it will be recognized by those of skill in the art that various other modifications, alternative constructions, and equivalents may be used without departing from the spirit of the invention. Accordingly, the above description should not be taken as limiting the scope of the invention, which is defined in the following claims.

What is claimed is:

1. A wavelength router for receiving, at an input port, light having a plurality of spectral bands and directing subsets of the spectral bands to respective ones of a plurality of output ports, the wavelength router comprising:
   an optical train disposed between the input port and output ports providing optical paths for routing the spectral bands, the optical train including a half-wave plate and a dispersive element disposed to intercept light traveling from the input port, the optical train being configured so that light encounters the dispersive element and the half-wave plate twice before reaching any of the output ports; and
   a routing mechanism having at least one dynamically configurable routing element to direct a given spectral band to different output ports depending on a state of the dynamically configurable routing element.

2. The wavelength router recited in claim 1 wherein the optical train comprises a free-space optical train.

3. The wavelength router recited in claim 1 wherein the routing mechanism includes a plurality of retroreflecting elements, each associated with a respective one of the spectral bands.

4. The wavelength router recited in claim 3 wherein at least one of the retroreflecting elements is configured to reflect the given spectral band an even number of times.

5. The wavelength router recited in claim 4 wherein each of the retroreflecting elements is configured to reflect the given spectral band twice.

6. The wavelength router recited in claim 3 wherein each of the retroreflecting elements includes a rotational degree of freedom.

7. The wavelength router recited in claim 1 wherein a fast axis of the half-wave plate is oriented substantially at an odd multiple of 22.5° with respect to a polarization axis of the given spectral band.

8. The wavelength router recited in claim 1 wherein the dispersion element comprises a grating.

9. The wavelength router recited in claim 1 wherein:
the optical train further includes a lens;
the dispersive element comprises a reflection grating;
light coming from the input port is collimated by the lens and dispersed by the reflection grating as a plurality of angularly separated beams corresponding to the spectral bands;
the angularly separated beams are focused by the lens on respective dynamically configurable routing elements comprised by the routing mechanism; and
the half-wave plate is disposed between the reflection grating and the routing mechanism.

10. The wavelength routing element recited in claim 9 wherein the half-wave plate is disposed between the lens and the reflection grating.

11. The wavelength routing element recited in claim 9 wherein the half-wave plate is disposed between the lens and the routing mechanism.

12. The wavelength routing element recited in claim 1 wherein:
the optical train further includes a first lens and a second lens;
the dispersive element comprises a transmissive grating;
light coming from the input port is collimated by the first lens and dispersed by the transmissive grating as a plurality of angularly separated beams corresponding to the spectral bands;
the angularly separated beams are focused by the second lens on respective dynamically configurable routing elements comprised by the routing mechanism; and
the half-wave plate is disposed between the transmissive grating and the routing mechanism.

13. The wavelength routing element recited in claim 12 wherein the half-wave plate is disposed between the transmissive grating and the second lens.

14. The wavelength routing element recited in claim 12 wherein the half-wave plate is disposed between the second lens and the routing mechanism.

15. The wavelength routing element recited in claim 1 wherein:
the dispersive element comprises a reflection grating;
the optical train further includes a curved reflector disposed to intercept light from the input port, collimate the intercepted light, direct the collimated light toward the reflection grating, intercept light reflected from the reflection grating, focus the light, and direct the focused light on respective dynamically configurable routing elements comprised by the routing mechanism.

16. A wavelength router for receiving, at an input port, light having a plurality of spectral bands and directing subsets of the spectral bands to respective ones of a plurality of output ports, the wavelength router comprising:
an optical train disposed between the input port and output ports providing optical paths for routing the spectral bands, the optical train including a quarter-wave plate having a fast axis oriented substantially at an odd multiple of 45° with respect to a polarization axis of the spectral bands and a dispersive element disposed to intercept light traveling from the input port, the optical train being configured so that light encounters the dispersive element and the quarter-wave plate twice before reaching any of the output ports; and
a routing mechanism having a plurality of retroreflecting elements, each such retroreflecting element being configured to reflect a respective one of the spectral bands an odd number of times to direct the respective one of the spectral bands to different output ports depending on a state of the retroreflecting element.

17. The wavelength routing element recited in claim 16 wherein at least one of the retroreflecting elements is configured to reflect the respective one of the spectral bands three times.

18. The wavelength routing element recited in claim 16 wherein:
the optical train further includes a lens;
the dispersive element comprises a reflection grating;
light coming from the input port is collimated by the lens and dispersed by the reflection grating as a plurality of angularly separated beams corresponding to the spectral bands;
the angularly separated beams are focused by the lens on the respective retroreflecting elements; and
the quarter-wave plate is disposed between the reflection grating and the routing mechanism.

19. The wavelength routing element recited in claim 18 wherein the quarter-wave plate is disposed between the lens and the routing mechanism.

20. The wavelength routing element recited in claim 16 wherein:
the optical train further includes a first lens and a second lens;
the dispersive element comprises a transmissive grating;
light coming from the input port is collimated by the first lens and dispersed by the transmissive grating as a plurality of angularly separated beams corresponding to the spectral bands;
the angularly separated beams are focused by the second lens on the respective retroreflecting elements; and
the quarter-wave plate is disposed between the transmissive grating and the routing mechanism.

21. The wavelength routing element recited in claim 20 wherein the quarter-wave plate is disposed between the second lens and the routing mechanism.

22. The wavelength routing element recited in claim 16 wherein:
the dispersive element comprises a reflection grating;
the optical train includes a curved reflector disposed to intercept light from the input port, collimate the intercepted light, direct the collimated light toward the reflection grating, intercept light reflected from the reflection grating, focus the light, and direct the focused light on the respective retroreflecting elements.

23. A wavelength router for receiving, at an input port, light having a plurality of spectral bands and directing subsets of the spectral bands to respective ones of a plurality of output ports, the wavelength router comprising:
an optical train disposed between the input port and output ports providing optical paths for routing the spectral bands, the optical train including a quarter-wave plate and a dispersive element disposed to intercept light traveling from the input port, the optical train being configured so that light encounters the dispersive element and the quarter-wave plate twice before reaching any of the output ports; and a routing mechanism having a plurality of retroreflecting elements, each such retroreflecting element being configured to reflect a respective one of the spectral bands an odd number of times greater than two to direct the respective one of the spectral bands to different output ports depending on a state of the retroreflecting element.

24. The wavelength routing element recited in claim 23 wherein:

the optical train further includes a lens;

the dispersive element comprises a reflection grating;

light coming from the input port is collimated by the lens and dispersed by the reflection grating as a plurality of angularly separated beams corresponding to the spectral bands;

the angularly separated beams are focused by the lens on the respective retroreflecting elements; and the quarter-wave plate is disposed between the reflection grating and the routing mechanism.

25. The wavelength routing element recited in claim 23 wherein:

the optical train further includes a first lens and a second lens;

the dispersive element comprises a transmissive grating;

light coming from the input port is collimated by the first lens and dispersed by the transmissive grating as a plurality of angularly separated beams corresponding to the spectral bands;

the angularly separated beams are focused by the second lens on the respective retroreflecting elements; and the quarter-wave plate is disposed between the transmissive grating and the routing mechanism.

26. The wavelength routing element recited in claim 23 wherein:

the dispersive element comprises a reflection grating;

the optical train includes a curved reflector disposed to intercept light from the input port, collimate the intercepted light, direct the collimated light toward the reflection grating, intercept light reflected from the reflection grating, focus the light, and direct the focused light on the respective retroreflecting elements.

27. A method for directing a light beam having a plurality of spectral bands received at an input port, the method comprising:

collimating the light beam;

dispersing the collimated light beam into a plurality of angularly separated beams corresponding to the spectral bands;

propagating the angularly separated beams through a half-wave, plate wherein a fast axis of the half-wave plate is oriented substantially at an odd multiple of 22.5° with respect to a polarization axis of the angularly separated beams;

focusing the angularly separated beams; and routing the angularly separated beams to respective ones of a plurality of output ports.

28. The method recited in claim 27 wherein routing the angularly separated beams to respective ones of the plurality of output ports comprises retroreflecting the angularly separated beams by reflecting each such angularly separated beam an even number of times.

29. The method recited in claim 28 wherein routing the angularly separated beams to respective ones of the plurality of output ports further comprises again propagating the angularly separated beams through the half-wave plate.

30. A method for directing a light beam having a plurality of spectral bands received at an input port, the method comprising:

collimating the light beam;

dispersing the collimated light beam into a plurality of angularly separated beams corresponding to the spectral bands;

propagating the angularly separated beams through a quarter-wave plate having a fast axis oriented substantially at an odd multiple of 45° with respect to a polarization axis of the angularly separated beams;

focusing the angularly separated beams; and retroreflecting the angularly separated beams by reflecting each such angularly separated beam an odd number of times.

31. The method recited in claim 30 wherein routing the angularly separated beams to respective ones of the plurality of output ports further comprises again propagating the angularly separated beams through the quarter-wave plate.

32. A wavelength router for receiving, at an input port, a beam having a plurality of spectral bands and directing subsets of the spectral bands to respective ones of a plurality of output ports, the wavelength router comprising:

means for collimating the beam;

means for dispersing the collimated beam into a plurality of angularly separated beams corresponding to the spectral bands;

means for 90° rotation of polarization components of the angularly separated beams, wherein the means for 90° rotation of polarization components has a fast axis oriented substantially at an odd multiple of 22.5° with respect to a polarization axis of the angularly separated beams; and means for routing the angularly separated beams to the output ports.

33. A wavelength routing element for receiving, at an input port, a beam having a plurality of spectral bands and directing subsets of the spectral bands to respective ones of a plurality of output ports, the wavelength router comprising:

means for collimating the beam;

means for dispersing the collimated beam into a plurality of angularly separated beams corresponding to the spectral bands;

means for 45° rotation of polarization components of the angularly separated beams, wherein such means for 45° rotation has a fast axis oriented substantially at an odd multiple of 45° with respect to a polarization axis of the angularly separated beams; and means for routing the angularly separated beams to the output ports, such means for routing including means for retroreflecting the angularly separated beams by reflecting each such angularly reflected beam an odd number of times.

34. The wavelength routing element recited in claim 33 wherein the number of times is three.

* * * * *

UNITED STATES PATENT AND TRADEMARK OFFICE
CERTIFICATE OF CORRECTION

PATENT NO.        : 7,054,561 B2                                    Page 1 of 1
APPLICATION NO. : 10/076182
DATED             : May 30, 2006
INVENTOR(S)      : Fabiny It is certified that error appears in the above-identified patent and that said Letters Patent is hereby corrected as shown below:

Cover page, (56) U.S. Patent Documents, add the following reference
   --6,275,623 B2        8/2001        Brophy et al.--

Column 5, line 65, delete "they" and insert --the y--

Column 8, line 33, delete "IC" and insert --1C--

Column 12, line 20, delete "SD" and insert --5D--

Column 13, line 22, delete "450" and insert --45°--

Signed and Sealed this

Fifteenth Day of August, 2006

JON W. DUDAS
*Director of the United States Patent and Trademark Office*